Patented July 17, 1923.

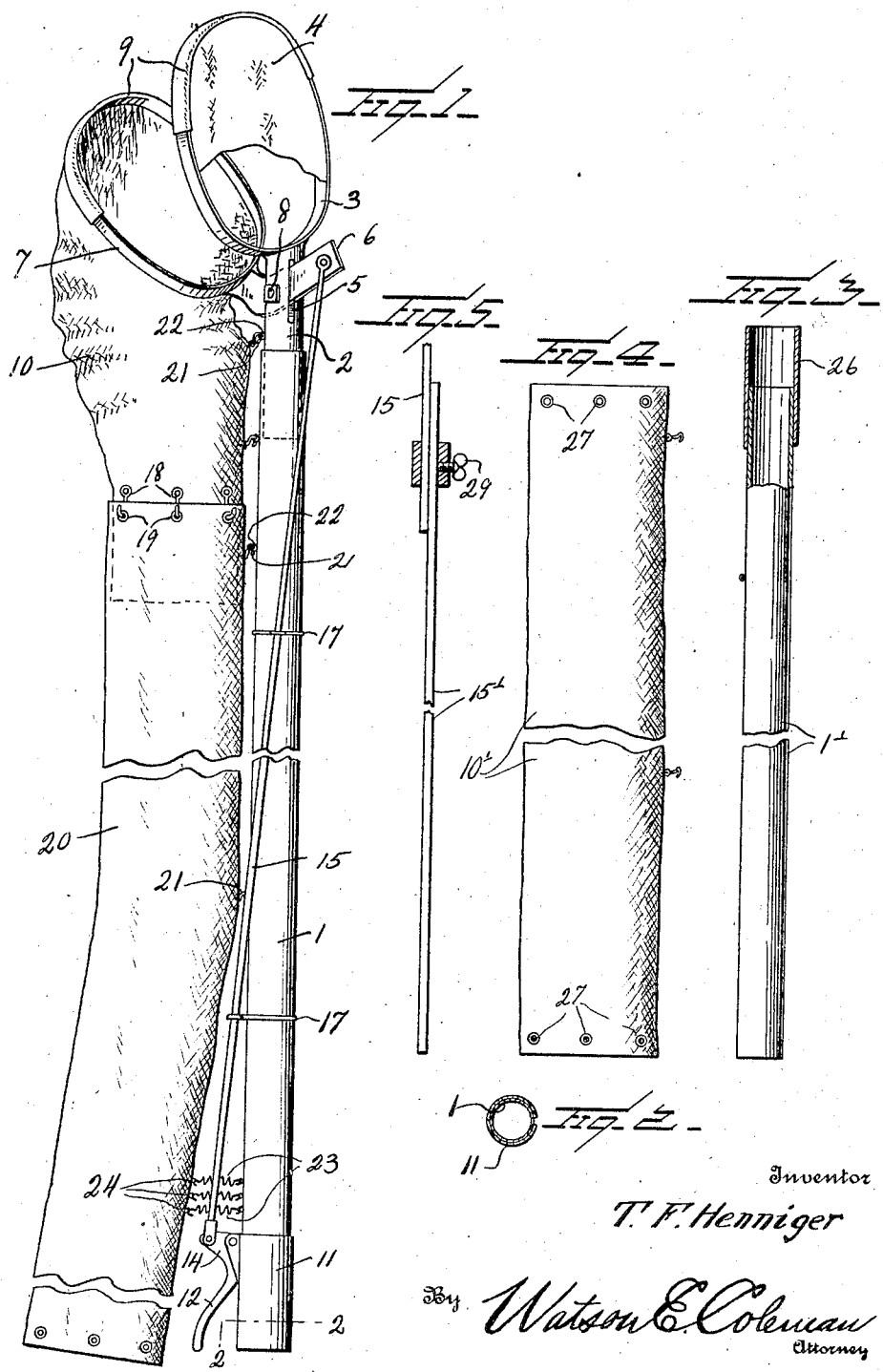

1,462,008

UNITED STATES PATENT OFFICE.

THEODORE F. HENNINGER, OF MEMPHIS, TENNESSEE.

FRUIT PICKER.

Application filed April 1, 1922. Serial No. 548,731.

*To all whom it may concern:*

Be it known that I, THEODORE F. HENNIGER, a citizen of the United States, residing at Memphis, in the county of Shelby and State of Tennessee, have invented certain new and useful Improvements in Fruit Pickers, of which the following is a specification, reference being had to the accompanying drawings.

This invention relates to certain improvements in fruit pickers and it is an object of the invention to provide a novel and improved device of this general character operable in a manner whereby fruit may be picked and collected with rapidity and in a manner whereby the possibility of bruising fruit is substantially eliminated.

Another object of the invention is to provide a novel and improved device of this character comprising two relatively movable jaws, one of said jaws having associated therewith a tube of a length to deliver the fruit dropping therein where desired, together with means whereby the requisite relative movement of the jaws to first pick or pull the fruit may be effected by slight movement of a finger on a hand supporting or steadying device.

An additional object of the invention is to provide a novel and improved device of this general character comprising a pair of co-acting, movable picker jaws provided with lips of soft rubber or kindred material to prevent bruising or other injury to the fruit upon pulling the fruit.

Furthermore, it is an object of the invention to provide a novel and improved device of this general character which may be extended or shortened as the necessities of practice may necessitate and which includes a tube or elongated sack having associated therewith means to yieldingly retard the travel of the fruit through the tube or sack to prevent bruising of the fruit.

The invention consists in the details of construction and in the combination and arrangement of the several parts of my improved fruit picker whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein:

Figure 1 is a view in perspective illustrating a fruit picker constructed in accordance with an embodiment of my invention, Figure 2 is a sectional view taken substantially on the line 2—2 of Fig. 1, Figure 3 is a view partly in elevation and partly in section illustrating an additional pole or handle section, Figure 4 is an elevational view illustrating an additional sack or tube section, and Figure 5 is a fragmentary view partly in elevation and partly in section illustrating a means for coupling adjacent rod sections.

As disclosed in the accompanying drawing, 1 denotes a pole or handle section, preferably five feet in length and tubular, said section being formed of any desired material and more particularly of galvanized sheet iron. Engaged within the outer end portion of the pole or handle section 1 is the shank or tang 2 of a jaw member. The jaw member 3 is substantially oval in form with its major diameter disposed in the same general construction as the section 1 but on a predetermined angle with respect thereto.

This jaw 3 is preferably formed of aluminum and suitably secured thereto and disposed over the central opening defined thereby is a hood or cover 4 of canvas or other suitable material.

The tang or shank 2 of the jaw 3 at a point in close proximity to said jaw and outwardly of the adjacent end is provided with an opening 5 through which is disposed a shank or tang 6 of a second or movable jaw 7. The shank or tang 6 is pivotally engaged with the shank or tang 2 by the bolt 8 or the like. The jaw 7 is also oval in form and of the size in correspondence with the jaw 3. The jaw 7 has secured thereto an end portion of a flexible tube or elongated sack 10, said tube or sack being a substantial continuation of the central opening defined by the jaw, 7.

The outer end portion of the jaws 3 and 7 are provided with the lips 9 of soft rubber or kindred material and which lips serve to prevent bruising of the fruit when first pulled from the tree. In practice it is to be understood that the fruit to be picked is arranged between the jaws 3 and 7 where-upon the jaw 7 is moved inwardly toward the jaw 3 to engage the stem of the fruit, so that upon slight pull being imposed upon the handle or pole section 1, such fruit will be separated from the tree and caused to drop through the jaw 7 into the tube or sack section 10. The hood or cover 4 which prevents the severed fruit from passing outwardly through the jaw 3 operates to assure the proper entrance of such fruit into the tube or sack 10. The opposite end portion of the handle or pole section 1 has a split sleeve or band clamp 11 and which provides a mounting for the trigger 12, mounted for rocking or swinging movement. The pivoted end portion of the trigger 12 is provided with a tail or extension 14 with which is operatively engaged an end portion of a rod 15, the opposite end portion of said rod 15 being operatively engaged with the outer or free end portion of the shank or tang. By this arrangement upon slight pressure being imposed upon the trigger 12 sufficient pull will be imposed upon the rod 15 to cause the jaw 7, which may be termed the lower jaw, to move toward the jaw 3 and to effect the desired severing or picking action.

To facilitate the functioning of the trigger 12 I believe it to be of advantage, although not necessary, to have said trigger positioned at the side portion of the handle or pole section 1, substantially diametrically opposed to the shank or tang 6.

The handle or pole section 1 at predetermined points thereon is provided with the guide members 17 through which the rod 15 is freely disposed.

The lower or free end portion of the tube or sack section 10 has secured to the outer face thereof a series of circumferentially spaced fastening members 18 herein disclosed as hooks which are adapted to be engaged with the eye members 19 circumferentially spaced around an end portion of a second tube or sack section 20. A portion of this section 20 is provided with a plurality of longitudinally spaced fastening members 21 such as hooks which are engaged with the eye members 22 or the like suitably positioned upon the handle or pole member 1 whereby an effective support is provided for said sack or tube section 20. This support or section 20 is of particular advantage as it relieves the section 10 and the jaw 7 of the weight of the section 20 or other sections which may be employed so that the jaw 7 is free to move with a minimum of resistance.

The lower portion of the handle member or section 1 has secured thereto the extremities of a plurality of coil springs 23 and the adjacent portion of the tube or sack section 20 is provided with a series of eye members 24, with each of which a spring 23 may be engaged. When the device is employed in the gathering and picking of light fruit, such as cherries or the like, a single spring 23 is engaged with the tube or sack section 20 and this spring serves to absorb the shock of the fruit dropping within the tube or sack and to sufficiently retard its progress therethrough so that the possibility of bruising such fruit is substantially eliminated. With heavier fruit, the remaining springs 23 are engaged with the tube or sack 20 as may be required.

At this time it is to be particularly noted that my improved picker can be employed with advantage to the gathering of fruit ranging in size of that of cherries and grape fruit.

In practice the handle or pole section 1 is held by both hands of the operator, the lower end being so positioned as to readily permit a finger to engage the trigger 12 as required. By this means the device is supported by one of the hands and steadied by the other, and which permits the device to be employed with rapidity.

My improved device may be lengthened as required by employing additional handle or pole sections 1' which are coupled to each other or to the pipe or handle section 1 by a collar 26. As the device is lengthened additional tube or sack sections 10' are employed, adjacent end portions of such sections 10' being provided with co-acting separable fasteners 27 such as snap buttons. In practice the tube or sack may be caused to discharge or deliver the fruit within a bag or other suitable receptacle carried by the operator or the fruit may be delivered upon the ground to be afterwards gathered. As the device is extended, the split sleeve or clamp band 11 is applied to the outer end portion of the lower applied section 1', and additional rods 15' of desired lengths are employed on the adjacent end portions of the rods 15' or on adjacent ends of a rod 15 and a rod 15' are connected or coupled by a sleeve carrying the clamping screws 29.

The supplemental handle or pole sections 1' are also tubular and preferably formed from galvanized sheet iron. I also find it of particular advantage in practice to have the handle or pole 1 and the supplemental section 1' about five feet in length with the additional supplemental parts of a device of substantially the same lengths.

From the foregoing description it is thought to be obvious that a fruit picker constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In a fruit picker, the combination with a supporting pole, coacting jaws carried by the outer end portion of the pole, a tube secured to one of the jaws and leading therefrom, means for securing the tube to the pole, a spring interposed between and connected to the pole and tube, the spring serving to absorb the shock of the fruit dropping within the tube and to retard the progress of the fruit through the tube.

2. In a fruit picker, the combination with a supporting pole, coacting jaws carried by the outer end portion of the pole, a tube secured to one of the jaws and leading therefrom, means for securing the tube to the pole, a plurality of springs interposed between and connected to the pole and tube, the springs serving to absorb the shock of the fruit dropping within the tube and to retard the progress of the fruit through the tube.

In testimony whereof I hereunto affix my signature.

THEODORE F. HENNIGER.